May 16, 1933.  J. ROBINSON  1,908,866
AUTOMATIC TRAIN PIPE CONNECTER
Original Filed May 3, 1929  2 Sheets-Sheet 1
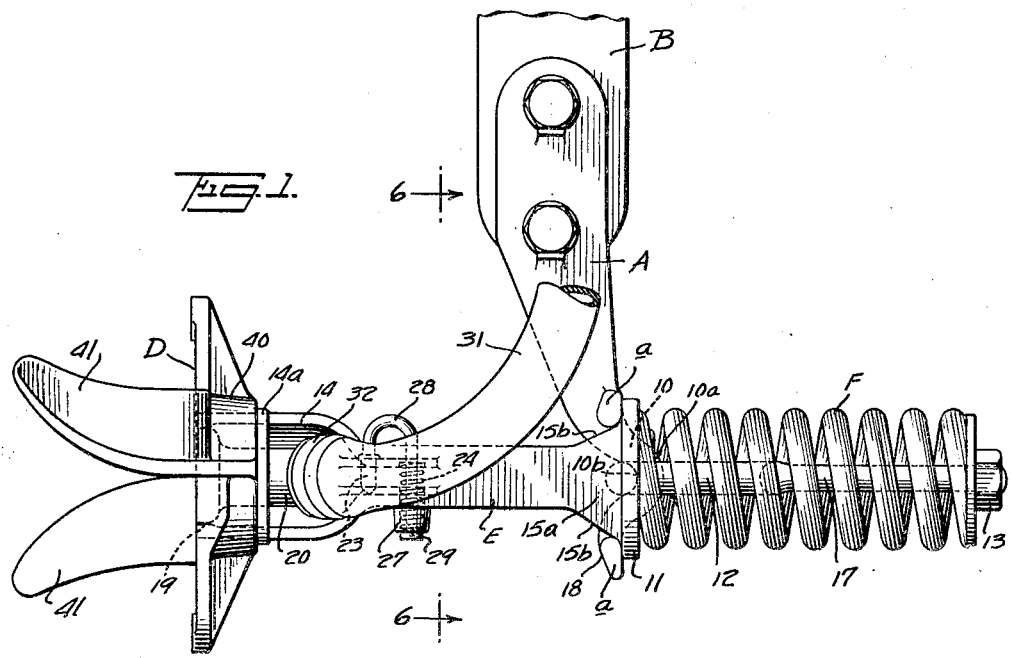
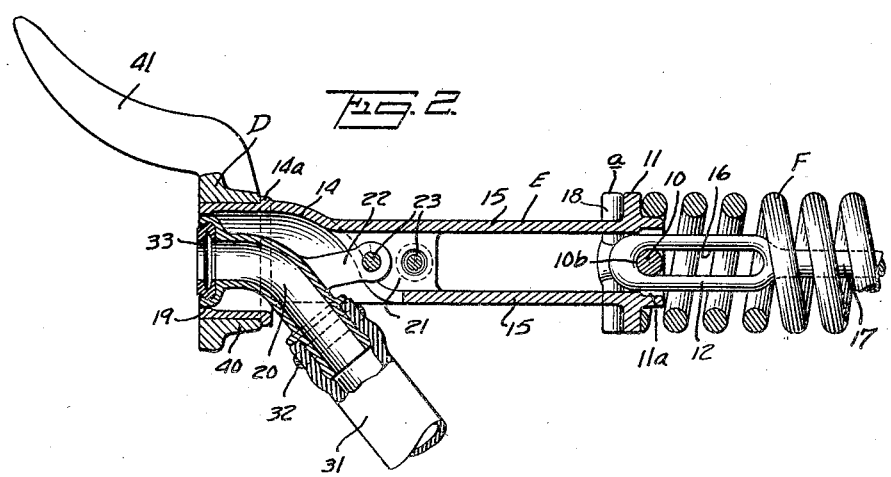
INVENTOR
Joseph Robinson
BY
Watson, Coit, Morse & Grindle
ATTORNEY May 16, 1933. J. ROBINSON 1,908,866
AUTOMATIC TRAIN PIPE CONNECTER
Original Filed May 3, 1929  2 Sheets-Sheet 2
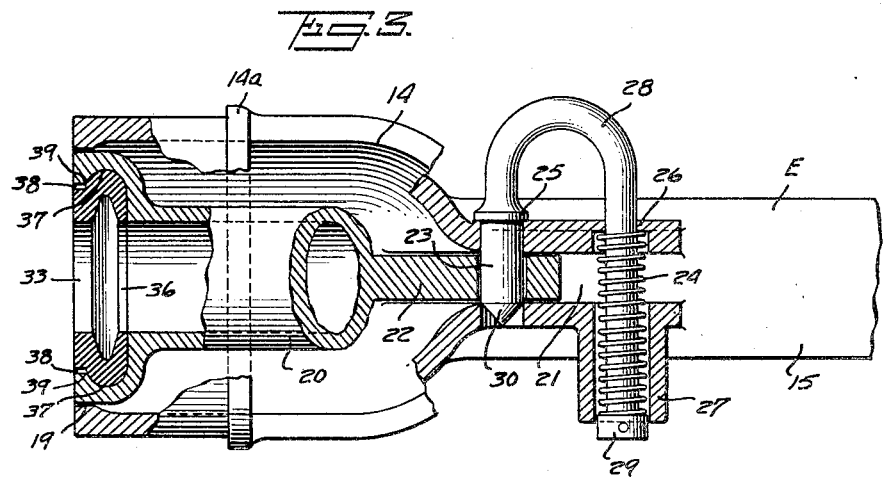
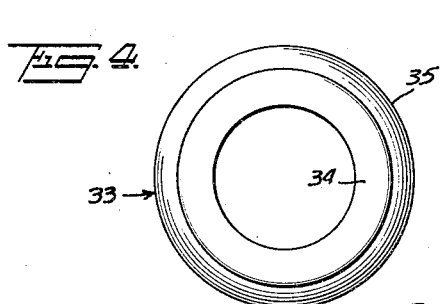
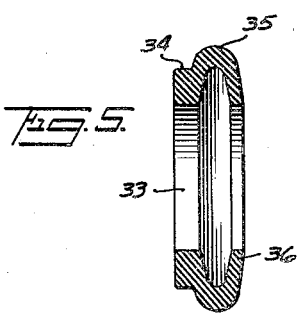
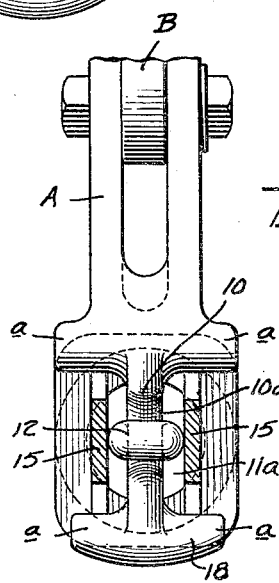
INVENTOR
Joseph Robinson
BY
Watson, Coit, Morse & Grindle
ATTORNEY Patented May 16, 1933

1,908,866

UNITED STATES PATENT OFFICE

JOSEPH ROBINSON, OF NEW YORK, N. Y.

AUTOMATIC TRAIN PIPE CONNECTER

Application filed May 3, 1929, Serial No. 360,195. Renewed September 29, 1932.

This application is a continuation in part of my co-pending application Serial No. 488,373, filed July 29, 1921.

This application relates particularly to a member for supporting the coupling head of an automatic train pipe connecter, and also to certain novel features of construction of such member which enables it to removably receive a conduit or nipple for conveying pressure fluid to the connecter head. The arrangement enables the member and head to be mounted for universal movement relative to a bracket which supports the same beneath the coupler of a car, which movement may safely be as much as 90°, or even more, to the longitudinal direction of the track. Locking means are provided for removably securing the conduit in place, and this means preferably includes a special expansible gasket.

More specifically the invention provides a supporting member which can be easily and cheaply produced, which can be fastened to the coupling head in a suitable manner as by being pressed into the same and which is provided with a hollow front portion for removably receiving a nipple or conduit secured to the end of a train pipe hose, the rear portion of the member having spaced straps which are adapted to lie on opposite sides of the supporting bracket so as to provide universal movement of the member and the head relative to the bracket and prevent undue rotation of the head. Arrangements are provided which prevent jamming or binding of the member on the bracket during any part of its range of movement.

My improvement is illustrated in the accompanying drawings forming a part hereof and in which:

Figure 1 is a side elevation of an arrangement containing the improvements of this application;

Figure 2 is a horizontal longitudinal view of a part of the construction illustrated in Figure 1;

Figure 3 is a sectional side view of the forward hollow end of the supporting member and the conduit, the gasket and the locking means for the conduit;

Figure 4 is a front view of the special gasket forming a part of improvement;

Figure 5 is a sectional side view of the gasket; and

Figure 6 is a front view showing the lower end of the bracket by which the head supporting member is carried. This view is taken on the line 6—6 of Figure 1.

Referring to the drawings by the reference characters thereon, A indicates a bracket which preferably spans and is rigidly attached to the usual lug B of the car coupler, and which is provided at its lower end with a generally vertically extending projection or anchor portion 10, preferably round in cross section as shown in Figures 1 and 2. The portion 10 is extended or curved rearwardly at $10^a$ to bring the center of curvature of the bearing $10^b$ on the front face of the projection 10 into approximately the plane occupied by the rear face of the bracket A. This arrangement gives the maximum of free movement to the connecter head and prevents binding or jamming of the supporting member E on the bracket, as will later be more fully pointed out.

A coupling head D is pressed onto or otherwise suitably secured to the forward end of the pipe or supporting member E, which member extends to the rear of the bracket A and is provided with a flange 11, yieldingly held against the bracket by a coiled spring F surrounding a stem or tierod 12 and held thereon by an abutment or nut 13 adjustably threaded to the rear end of the stem as shown. The member E preferably extends into the head at approximately the center of the latter and is provided with an enlaregd hollow forward end 14, and a pair of spaced straps 15 which lie in the horizontal plane and span the lower end of the bracket A and anchor device 10 and the tierod 12. An annular ring or collar $14^a$ on the forward end of the member 14 acts as a stop or shoulder against which the coupling head $D'$ abuts and by which its longitudinal position on the member E is determined and protected against change under the strains of service. At their forward end the straps or bars 15 of the member integrally or otherwise join the rear portion of the hollow end 14 of the member and at their rear end they integrally or otherwise join the flange 11. The front end of the tierod 12 loosely extends through an opening 11ª in the flange, which opening is partly occupied by the anchor device 10 as shown, and is provided with an elongated perforation 16 through which the anchor device or projection 10 of the bracket extends, the tierod 12 being reduced in cross section at 17 to afford a wide range of vertical and lateral movement of the rear end of the member E and the front end of the spring F relative to the tierod 12. The straps 15 are widened at their rear end 15ª where they join the flange 11, and have their upper and lower edges 15ᵇ inclined. These widened inclined portions occupy the space between the shoulders or projections a of the bracket when the coupling head D is uncoupled, and co-operate with the projections a to center and prevent undue rotation of the head. However, when the connecters couple the portions 15ª move away from the lugs or projections a and thus more freely permit of the aforesaid vertical and lateral movement of the member E and spring F. It will be noted that the projection or anchor device 10, and the head of the tierod 12, lie between the straps 15 and serve to centrally position the member E and head D on the bracket, and to guide the same in respect to the bracket through the various movements of the head and member in service.

The projection 10 of the bracket A is provided on the front face of the bearing or depression 10ᵇ aforesaid which the tierod 12 is arranged to engage, the contacting surfaces of the tierod and the projection 10 being flared in opposite directions at their point of contact which point of contact may lie either in front of or at the rear of the plane occupied by the rear face of the lower portion of the bracket. This construction provides a most efficient universal joint by which the coupling head D and the member or pipe E are supported on the bracket A for the maximum of free universal movement which accommodates all the positions of the car coupler in service and protects the coupling head and member against damage in case the car couplers slips by or pass each other. The supporting or buffer spring F acts to hold the forward end of the tierod firmly in the depression or bearing aforesaid on the front face of the projection 10, and thus effectively prevents, in co-operation with the transversely extending cross bar or portion 18 of the bracket dislodgment of the several parts from the bracket. As shown in Figures 1 and 6 the bracket straddles the coupler lug B and is rigidly secured thereto by suitable rivets or bolts.

As aforesaid, the forward end of the member E is hollow and within such hollow portion a laterally curved nipple or conduit 20 is mounted, this nipple forming the terminal portion of the air brake conduit and being inserted into the hollow end of the pipe or member E from one side thereof, as shown in Figures 1 and 2, the member being open at its front end and at said sides. The front end of the supporting member is provided with an interior annular ring or seat 19 which serves to centrally position the head or gasket end of the conduit 20 with respect to the member. To maintain the conduit in proper position in the supporting member E, with its face disposed in approximately the plane of the coupling face of the head D, the member is provided with a seat or recess 21 which may be suitably arranged in the supporting member but which is preferably horizontally disposed thereon. A projection or lug 22 extends from the conduit or nipple 20 into said recess and is removably locked therein by spring actuated locking device or plunger 23, preferably U-shaped. The pin lies between the straps 15 from the upper side of the supporting member E downwardly through the projection 22 and into the member at the lower side of the seat 19, the spring 24 serving to hold the locking device in position and thus securely maintain the conduit within the hollow of the supporting member E. A shoulder 25 is formed on the plunger to limit its downward movement, whilst the spring 24 and the wall 26 act as a stop to limit the upward movement of the pin or plunger 23. The spring 24 lies within a suitable housing 27 formed on the bottom of the member E, or otherwise located thereon, and is held in place on the bowed shank or neck 28 of the plunger pin by a suitable collar 29 which quite closely fits within the housing and acts as a guide which, with the opening in the wall 26, form a bearing which prevents tilting or binding of the locking device when it is operated. It will be noted that this locking device may obviously be differently arranged and located than is illustrated herein. It will be noted also that the tapered lower end 30 of the plunger pin is tapered to facilitate quick operation of the parts, this tapered end serving to shift the conduit 20 into proper position when it is being inserted into the hollow forward end of the supporting member E. As aforesaid the conduit 20 curves laterally out of the member, the forward or gasket end of the conduit occupying and filling the forward open end of the member E, and the laterally curved portion of the conduit partly filling the opening in the side of the member through which it extends. The usual train pipe hose 31 is suitably connected to the rear end of the conduit as by the customary hose clamp 32.

To facilitate speedy insertion and removal of the conduit 20, such removal being generally when it is desired to replace a worn gasket, the opening in the lug 22 of the conduit is preferably a little larger than the plunger pin 23 which passes through it. This difference in size is further desirable as a prevention against the parts fouling from rust. The pin holds the conduit against undue forward movement in the supporting member E, and locks it against undue rearward movement therein, and ordinarily the latter movement would have to be quite accurately maintained as to extent, especially with the loose fit mentioned between the lug 22 and the pin 23, in order to prevent leakage at the gaskets. In order to provide a perfectly tight gasket joint, and yet secure the advantages of the relatively loose connection between the lug 22 and the pin 23, and to compensate for wear on these parts, and to augment the locking effect which the spring 24 produces between the parts, I mount a novel form of air expanded gasket 33 in the forward end of the conduit 20. The gasket is provided with a face or front portion 34 and with a laterally extending flange 35, preferably semi-circular in cross section. The rear face of this flange is inclined rearwardly so as to require that the flange shall be placed under an initial compression when it is inserted into its seat in the conduit 20, this compression causing the gasket to snugly hug its seat and thus exclude from the seat moisture and other foreign substance. The gasket is provided with an interior annular groove centrally located with respect to the gasket flange, the provision of this groove converting the rear inclined face of the gasket into what may be described as inclined lip 36. The complementary seat 37 for the gasket in the front end of the conduit 20 snugly receives the gasket except at the point 38. Here the seat is slightly larger in diameter than the front portion 34 of the gasket. The purpose of this arrangement is to permit the front portion of the gasket to move bodily the maximum distance forward in approximately a vertical plane, instead of pivoting, or rolling, around the point 39 of the gasket seat in event of relative movement between coupled connecter heads D. It will be understood that the admission of fluid pressure to the gasket will cause the gasket to expand, the front portion 34 being driven forward practically against the similar portions of an opposing gasket, and the flange of the gasket swelled tightly into its seat in the conduit 20. The forward movement of the portion 34 of the gasket will of course kick the conduit rearwardly, thus compensating for any wear between the lug 22 and the plunger pin 23, and at the same time greatly increasing the locking effect between these parts.

As aforesaid any suitable coupling head D may be mounted on my improved supporting member E. The sole function of the head is to align the opposing members E in coupling the cars. Once these members are aligned and brought into engagement, the pressure of the buffer spring F will, on account of the extreme sensitiveness of the universal joint formed by the anchor device 10 and the tie rod 12, prevent unseating of the opposing members E. This has been frequently proven by service tests, and indicates the importance in this combination of the universal support illustrated. Preferably the coupling head D should have a suitable shank 40 to receive the front end of the member E in the arrangement of parts herein described. Suitable guides or gathering means 41 are provided on the coupling head D to effect the alignment of opposing members E. In the arrangement and assembly of the parts forming this application, the member E may be said to constitute a yieldingly sustained cage or housing into which the conduit 20 is removably mounted, the coupling head D serving to align mating cages E and hence opposing conduits 20.

It will be noted that the face of gasket 33 lies in approximately the plane of the front end of the member E, and that initial compression of the gasket in coupling is not depended upon to make a tight joint, reliance being also or chiefly had upon the fluid pressure admitted to the gasket to firmly seal the joints.

Lateral or pulling strains on the conduit 20 are of course resisted by engagement of the gasket end of the conduit with the surrounding walls of the end 14 of the supporting member E, and by the pin 23 which passes through the lug 22. This arrangement produces a powerful anchor for resisting these strains, and minimizes any tendency of the fitting to rock or bind in the member E and produce wear when mated connecters swing around an abrupt curve.

Having thus described the invention, what is claimed as new and desired to be secured by Letters Patent is:

1. As an article of manufacture, an integrally formed supporting member for a train pipe coupling head, said member having at its front end a hollow cylindrical portion adapted to be secured to a coupling head, said hollow portion being of a size to removably receive therein a fluid conducting conduit and having on one side an opening to permit the insertion and removal of such a conduit, spaced straps extending rearwardly from said hollow portion and a transversely arranged flange connecting the rear ends of said straps and having an opening therein in alignment with the space between said straps.

2. A construction for an automatic train pipe coupling comprising a coupling head having a coupling face and having an opening therein substantially at right angles to said face, an integrally formed head supporting member formed separately of the head and having an enlarged front end closely fitting and secured in said opening in the head, a fluid conduit removably mounted in said hollow portion of said member, said hollow portion at the rear of the head having on one side thereof an opening to permit insertion and removal of said conduit, spaced straps extending rearwardly from said hollow portion and a transversely arranged flange connecting the rear ends of said straps and having an opening therein in alignment with the space between said straps.

3. A construction for an automatic train pipe coupling comprising, a coupling head having an opening therein, an integral head supporting member formed separately of said head, said member at its front end having an enlarged hollow portion and also having a part extending rearwardly from said hollow portion, said hollow portion including a substantially cylindrical part, which part is arranged in and closely fits said opening in the head, said hollow portion being of a size to removably receive therein a fluid conducting conduit and having on one side an opening to permit the insertion and removal of such a conduit, substantially as described.

4. A construction as defined in claim 2 including a latch movably supported on said member and arranged to engage and removably lock said conduit in said hollow portion.

5. A construction for an automatic train pipe coupling comprising, a coupling head having a coupling face provided with an opening, an integrally formed head supporting member formed separately of the head and having a hollow front end secured to said head in line with said opening, a fluid conduit removably mounted in said hollow portion of said member, said hollow portion at the rear of the head having on one side thereof an opening to permit insertion and removal of said conduit, spaced straps extending rearwardly from said hollow portion, and a transversely arranged flange connecting the rear ends of said straps and having an opening therein in alignment with the space between said straps.

6. A member for supporting a coupling head of an automatic train pipe connecter, said member having at its front end a hollow cylindrical portion, said hollow portion being of a size to removably receive therein a fluid conducting conduit and having on one side an opening to permit the insertion and removal of such conduit, spaced straps extending rearwardly from said hollow portion, and a transversely arranged flange connecting the rear ends of said straps and having an opening therein in alignment with the space between said straps.

In testimony whereof I hereunto affix my signature.

JOSEPH ROBINSON.